United States Patent
Klein

(10) Patent No.: US 10,169,583 B2
(45) Date of Patent: Jan. 1, 2019

(54) MALWARE DROPPER DISCOVERY METHOD AND SYSTEM

(71) Applicant: Trusteer Ltd., Tel Aviv (IL)

(72) Inventor: Amit Klein, Herzliya (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 203 days.

(21) Appl. No.: 14/181,843

(22) Filed: Feb. 17, 2014

(65) Prior Publication Data

US 2015/0235026 A1    Aug. 20, 2015

(51) Int. Cl.
*G06F 21/56* (2013.01)
*G06F 21/55* (2013.01)

(52) U.S. Cl.
CPC .......... *G06F 21/566* (2013.01); *G06F 21/552* (2013.01)

(58) Field of Classification Search
CPC ........ G06F 21/55; G06F 21/577; G06F 21/00; G06F 11/30; G06F 21/56; G06F 11/3003; G06F 2201/865; G06F 21/563; G06F 17/30876; G06F 21/554; G06F 2221/033; H04L 63/105; H04L 67/22; H04L 69/329; H04L 63/1441
USPC ............. 726/22–25; 713/187; 714/38.11, 45; 709/217, 223–224
See application file for complete search history.

(56) References Cited

U.S. PATENT DOCUMENTS

| | | | | |
|---|---|---|---|---|
| 6,738,932 B1* | 5/2004 | Price | ........................ | 714/38.11 |
| 8,140,664 B2* | 3/2012 | Huang et al. | ................ | 709/224 |
| 8,347,382 B2* | 1/2013 | DeLuca et al. | ................. | 726/22 |
| 8,572,740 B2* | 10/2013 | Mashevsky et al. | .......... | 726/24 |
| 9,336,389 B1* | 5/2016 | Okereke | ................ | G06F 21/56 |
| 2003/0200305 A1* | 10/2003 | Tarby | .................... | H04L 29/06 709/224 |
| 2004/0098599 A1* | 5/2004 | Bentley | ....................... | 713/187 |

* cited by examiner

*Primary Examiner* — Thanhnga B Truong
(74) *Attorney, Agent, or Firm* — Daniel J. Swirsky; AlphaPatent Associates Ltd.

(57) ABSTRACT

A process for finding potentially harmful malware dropper on an infected computer system includes the steps of a) identifying an executable file that is about to run, and b) providing a storage agent that stores a copy of said executable file for a later inspection.

12 Claims, 1 Drawing Sheet

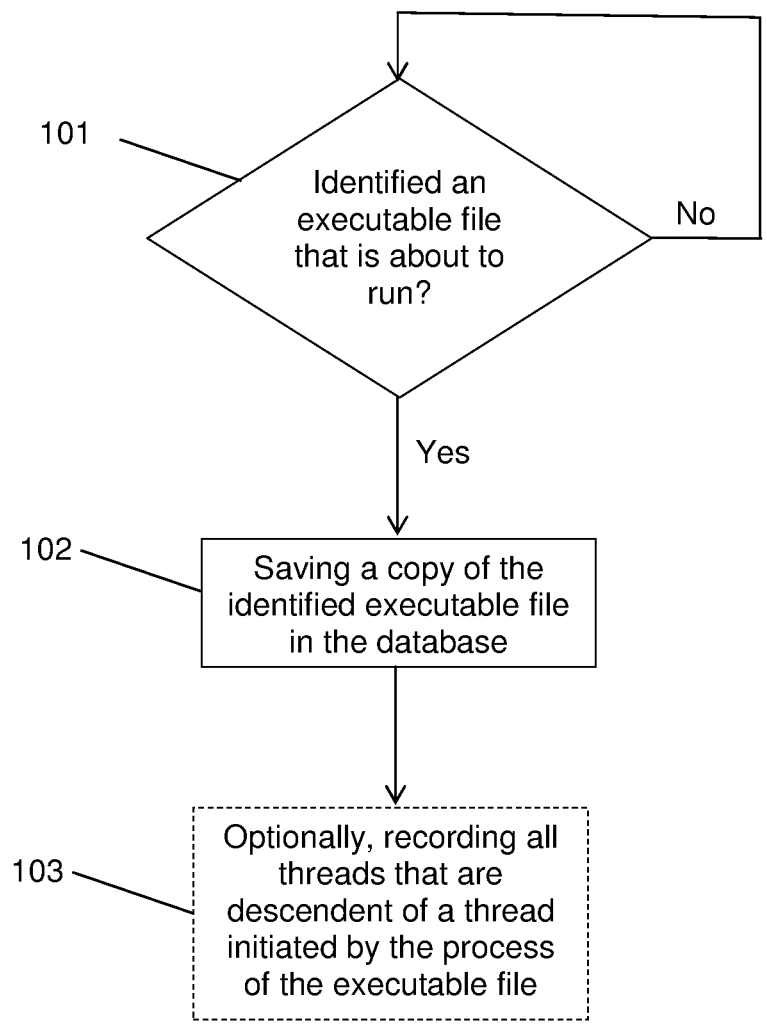

MALWARE DROPPER DISCOVERY METHOD AND SYSTEM

FIELD OF THE INVENTION

The present invention relates to the field of software security. More particularly, the invention relates to a method and system for saving n last executable files to obtain malware dropper.

BACKGROUND OF THE INVENTION

A dropper is a program that has been designed to "install" malware to a target system. The malware code can be contained within the dropper (single-stage) in such a way as to avoid detection by virus scanners or the dropper may download the malware to the target machine once activated (two-stage). Anti-malware solutions defend against malware attack by actively identifying the potential presence of malware at the earliest possible time, or by more passive approach of periodically scanning a computer system for the presence of malware. However, malware is constantly developed, which has different ways to make it more difficult to identify, and therefore, such solutions do not hermetically prevent potential malware form being installed in a computer system, in particular by a malware dropper.

Once a malware has been installed it is often evades detection by stealth. Malware also evades removal by being so complicated that it is difficult to remove all traces of the malware from an infected computer system.

The art constantly seeks new and improved ways to fight malware, but it seems that no solutions exist to date, to identify the potential presence of malware dropper at an infected machine especially when the original dropper deleted itself.

It is an object of the present invention to provide to provide a method and system which is capable of obtaining dropper samples which can be studied and analyzed (offline) to develop specific antidotes.

It is another object of the present invention to provide a method and system that overcomes the shortcomings of existing anti-malware solutions as is capable of facilitating malware detection/prevention because it provides a way to obtain malware samples.

Other objects and advantages of the invention will become apparent as the description proceeds.

SUMMARY OF THE INVENTION

In one aspect the invention relates to a process for finding potentially harmful malware dropper on an infected computer system, comprising the steps of:
 a) identifying an executable file that is about to run; and
 b) providing a storage agent that stores a copy of said executable file for a later inspection.

According to an embodiment of the invention, the process further comprises generating a log that includes information related to threads initiated by the process of the executable file.

Although the invention is not limited to any specific operating system, according to one embodiment of the invention the storage agent operates in a Windows® environment.

The storage agent can also maintain a white list of legitimate executable files, which may streamline its operation, although the invention can operate without any such white list. The legitimate executable files can be defined according to their file size (e.g., a file size larger than 2 megabyte), files having a valid digital signature that ensures the authenticity of the executable file, etc.

According to an embodiment of the invention, when the storage agent identifies an executable file that is about to run it checks its cryptographic hash algorithm, to determine whether said executable file has run in the system before. If it appears that the executable file is running for the first time, the storage agent creates a log for said executable file.

According to an embodiment of the invention, the executable file to be stored is first subjected to one or more filtering rules (e.g. if the file is digitally signed, size criteria, detection of packed code, etc.), and only if one or more said rules are met, said executable file is stored.

In another aspect the invention relates to a system, which comprises:
a) at least one processor; and
b) a memory comprising computer-readable instructions which when executed by the at least one processor causes the processor to execute a storage agent, wherein the storage agent:
 identifies an executable file that is about to run; and
 stores a copy of said executable in a database for later inspection.

In another aspect the invention relates to a non-transitory computer-readable medium comprising instructions which when executed by at least one processor causes the processor to perform the method of In another aspect the invention relates to a storage agent configured to store suspicious executable files in a database after identifying an executable file that is about to run.

BRIEF DESCRIPTION OF THE DRAWING

FIG. 1 is a schematic flow chart of a process according to one embodiment of the invention.

DETAILED DESCRIPTION OF THE INVENTION

In the description to follow the terms "malware", "potentially harmful code" and "malicious code" are used interchangeably. The invention addresses the problem of dealing with the detection of a malware dropper even days after the installation of the malware, and even if the original dropper already deleted itself.

As will be apparent to the skilled person, this process (i.e., the saving of n last executable files to obtain malware dropper) can be performed in a consecutive manner, thereby creating a database that includes copies of files executed on the computer system. According to the invention saving of the executable files in a database related to the computer system allows finding traces of the malware by a later inspection. In case that a stored executable file is a malware dropper, it can be studied and analyzed (offline) to develop specific antidotes. For instance, a situation in which the original malware dropper deleted itself from the computer system, a later inspection of the files stored in the database can categorize an executable file as potentially malicious and it can be done with greater confidence by examining elements, such as a missing digital signature, a particularly small file size, etc.

The invention, therefore, operates by saving the last unique n executable files that were executed on a computer system, essentially as follows:

1. The storage agent according to the invention identifies an executable file that is about to run, and stores a copy of that file in a database.
2. Optionally, the storage agent can determine if the executable file has run in the computer system before, e.g., by checking the cryptographic hash algorithm of that file (for instance, MD5 or SHA1 or SHA2). If it appears that this is the first time this executable runs, only then the monitoring agent will save a copy of that file. If it is not the first time, the storage agent can create a log associated with this executable file.

A process according to one embodiment of the invention is schematically illustrated with reference to FIG. 1, in which the following events take place:

101—An executable file that is about to run is identified;
102—A copy of the identified executable file is saved in a database;
103—Optionally, all threads that are descendent of a thread initiated by the process of the executable file are recorded.

The storage agent according to the invention can be of any suitable type, known to the skilled person, and may be, for instance, a kernel driver that identifies executable files that are about to run, e.g. (in Windows® XP) hooking the kernel SSDT entry NtCreateProcess and directing it to a loaded kernel module (driver). Alternatively the identification function of a running executable file (e.g. in Windows®—CreateProcess/CreateProcessEx) can be patched in almost all user-space processes.

According to an embodiment of the invention the storage agent records all threads that are descendent of the installation process of the suspicious executable file.

According to one embodiment of the invention the storage agent maintains a white list of legitimate executable files to avoid the need for store unsuspicious files, but white list is not necessary to carry out the invention, although it may be convenient in some cases. The legitimate executable files can be defined according to a file size (e.g., a file size larger than 2 megabyte), a valid digital signature that ensures the authenticity of the executable file, etc.

Although the database can be maintained locally on the machine which runs the storage agent itself, as will be apparent to the skilled person, the database can be also part of a private network or a Local Area Network (LAN) environment that includes the computer system. Alternatively, the database can be part of an external network (e.g., a third party remote server), in which the storage agent is configured to upload copies of the executable files to be stored in the database.

As will be appreciated by a skilled person, the database can be accessed either locally from within the private network or via an external network if allowed.

Once a potential malware dropper is identified, an existing anti-malware tool can be updated or a new anti-malware tool can be created in order take any suitable action, such as alerting a user, stopping one or more processes/threads, removing one or more processes/threads, etc. All said actions are conventional and well known to the skilled person and, therefore, are not described herein in detail. Persons skilled in the art will easily recognize malware against which the invention can be used, by examining suspicions executable files and accordingly tracing their origin and/or analyzing their behavior.

All the above description and examples have been provided for the purpose of illustration and are not intended to limit the invention in any way, except as provided for in the appended claims.

The invention claimed is:

1. A method for facilitating finding a potentially harmful malware dropper on a computer system, comprising the steps of:
   a) identifying an executable file upon execution of said executable file on a computer;
   b) storing, responsive to identifying said executable file upon execution of said executable file on said computer, a copy of said executable file in a database; and
   c) inspecting said copy of said executable file responsive to detecting malware on said computer and subsequent to said executable file deleting said executable file from said computer,
   wherein the identifying and storing are embodied in computer-readable instructions stored on a computer-readable medium for execution by a computer processor.

2. The method of claim 1, wherein the database is adapted to be accessed from a remote location.

3. A method according to claim 1, further comprising maintaining a white list of legitimate executable files.

4. A method according to claim 1, further comprising recording threads initiated by the process of the executable file.

5. A method according to claim 1, wherein the identifying comprises checking a cryptographic hash algorithm of the executable file to determine whether said executable file has previously run on said computer.

6. A method according to claim 1, wherein the storing is performed if it appears that the executable file is running for the first time on said computer.

7. A method according to claim 1, wherein the storing is performed after subjecting said executable file to one or more filtering rules, and only if one or more of said rules are met.

8. A system, comprising:
   a) at least one processor; and
   b) a memory comprising computer-readable instructions which when executed by the at least one processor causes the processor to execute a storage agent, wherein the storage agent:
      identifies an executable file upon execution of said executable file on a computer;
      stores, responsive to identifying said executable file upon execution of said executable file on said computer, a copy of said executable file in a database; and
      inspects said copy of said executable file responsive to detecting malware on said computer and subsequent to said executable file deleting said executable file from said computer.

9. A non-transitory computer-readable medium comprising instructions which when executed by at least one processor causes the processor to perform the method of claim 1.

10. A storage agent configured to:
    identify an executable file upon execution of said executable file on a computer,
    store, responsive to identifying said executable file upon execution of said executable file on said computer, a copy of said executable file in a database, and
    inspect said copy of said executable file responsive to detecting malware on said computer and subsequent to said executable file deleting said executable file from said computer.

11. The method of claim 1 wherein the identifying comprises hooking a kernel-based create process function of the computer.

12. The method of claim 1 wherein the identifying comprises hooking a user space-based create process function of the computer.

\* \* \* \* \*